United States Patent [19]

Mayhall, Jr. et al.

[11] Patent Number: 4,781,215
[45] Date of Patent: Nov. 1, 1988

[54] PACKAGE WRAPPING MACHINE SYSTEM

[76] Inventors: Riley H. Mayhall, Jr., P.O. Box 309, Burtonsville, Md. 20866; Andrew Zudal, 4140 Mt. Olney La., Olney, Md. 20832

[21] Appl. No.: 735,640

[22] Filed: May 20, 1985

Related U.S. Application Data

[60] Division of Ser. No. 521,023, Aug. 9, 1983, abandoned, which is a continuation of Ser. No. 165,770, Jul. 3, 1980, abandoned.

[51] Int. Cl.$^4$ ............................................. F16L 39/04
[52] U.S. Cl. ..................................... 137/580; 285/134; 285/136
[58] Field of Search ................. 137/580; 285/134, 136, 285/137.1

[56] References Cited

U.S. PATENT DOCUMENTS

| | | | |
|---|---|---|---|
| 1,167,517 | 1/1916 | Pearson | 285/134 X |
| 2,293,585 | 8/1942 | Bard | 285/136 |
| 2,294,214 | 8/1942 | Seinfeld | 137/580 X |
| 2,563,531 | 8/1951 | Kirkman et al. | 137/580 X |
| 3,519,201 | 7/1970 | Eisel et al. | 285/134 X |
| 3,527,482 | 9/1970 | Casterline et al. | 137/580 X |
| 4,142,742 | 3/1979 | Cornett et al. | 285/136 |
| 4,214,780 | 7/1980 | Grace | 285/134 |
| 4,218,185 | 8/1980 | Trytek | 137/580 X |
| 4,283,903 | 8/1981 | Mayhall et al. | 53/587 |

Primary Examiner—John Rivell

[57] ABSTRACT

A rotary set on a shaft fluid power coupling which may be used on a package wrapping machine is disclosed. The coupling is shown in FIG. 14 of the drawings.

The coupling has a first member having a central bore through which a rotary main shaft passes, and is characterized by a face which lies in a plane perpendicular to the shaft which has a cylindrical annular groove therein. A passage within said first member permits fluid to flow to said annular groove. The coupling has a second member which rotates with respect to said first member, and has a face which lies in a plane perpendicular to the main shaft axis of rotation. The second member also has a cylindrical annular extension which extends into said first member cylindrical annular groove. Fluid is passed from the annular space formed between said annular groove and said annular extension to a second member second face which has a fluid passage way connecting means. The second member cylindrical annular extension is engaged with said first member cylindrical annular groove by axially sliding said cylindrical extension into the cylindrical groove.

10 Claims, 14 Drawing Sheets

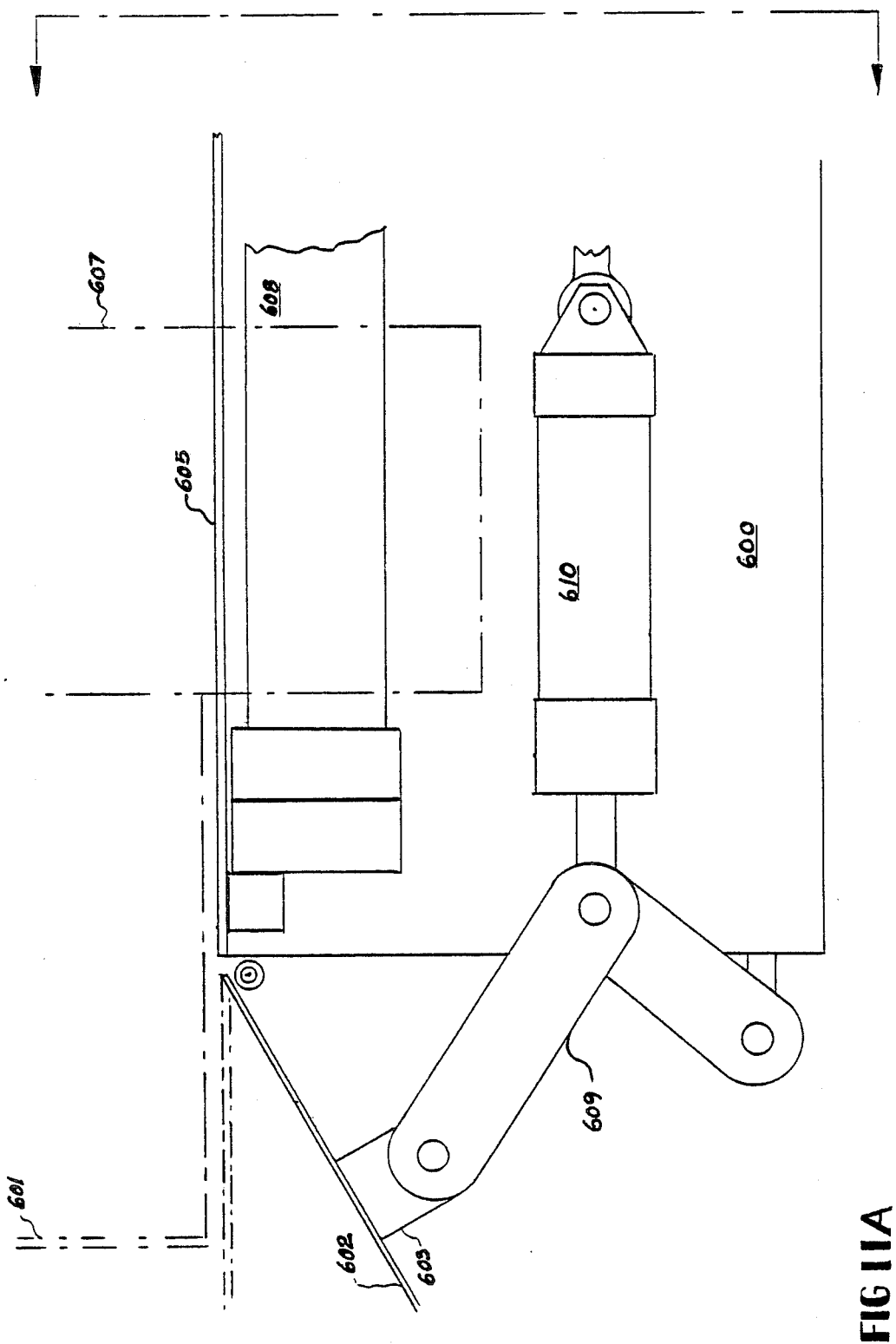

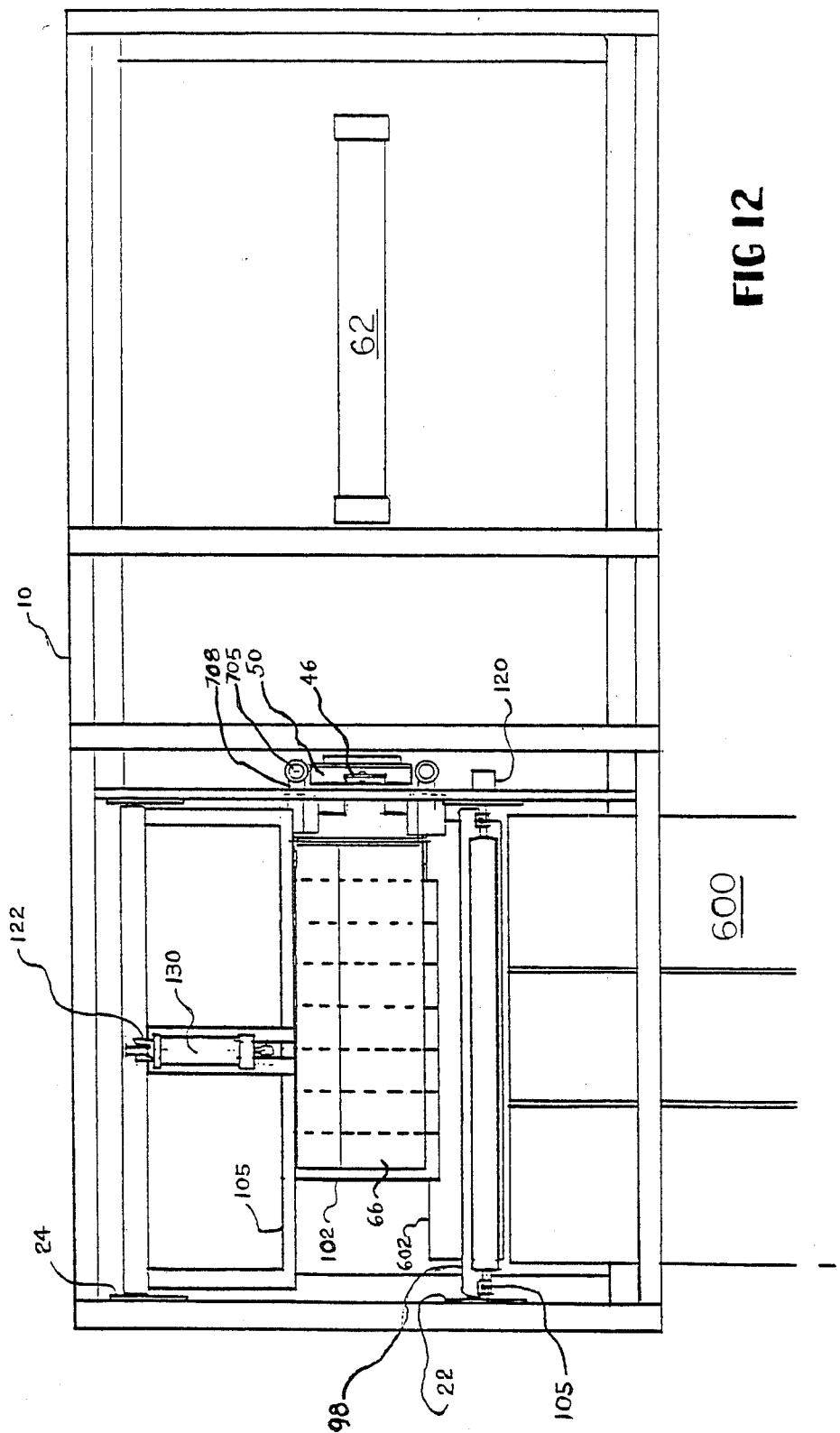

PACKAGE WRAPPING MACHINE SYSTEM

This application is a divisional of Ser. No. 521,023, filed Aug. 9, 1983, now abandoned, which is a continuation of Ser. No. 165,770, filed July 3, 1980, now abandoned.

BACKGROUND OF THE INVENTION

1. Prior Packaging Techniques

This invention is in the field of packaging and is more specifically directed to a new and improved method, apparatus, and system for wrapping a package with plastic film material so as to provide a strong and protective enclosure of the package in an economical manner. The term "package" as used herein is employed in its broadest generic sense and can comprise a plurality of bags, bundles, rolls, cans, or the like which are desired to be associated together in a unitary grouping or a single such bag or similar item about which it is desired to provide a protective wrapping or covering. For example, the finished package provided by the inventive system and method can consist of a plurality of bags such as bags of dog food, potting soil, books, newspapers, underwear or the like. Other examples of items capable of being associated together by the inventive system and method into a unitary package includes tubes, cartons, cans and rolls which are wrapped together by the inventive system and method to provide a unitized package consisting of a desired plurality of the particular items being wrapped.

Recognition of the foregoing problems has resulted in a number of both fully automatic and manual rotational wrapping machines which are used for wrapping items with a plastic film, paper, netting, etc. in a variety of ways. Unfortunately, the known wrapping machines suffer from a lack of quality of package and of versatility in that they are not complete systems and only capable of usage for wrapping only products within a relatively narrow range of dimensional configurations. In other words, many of the machines will only wrap a particular type and size of item such as a boxed or pallet mounted item and are incapable of usage for wrapping other items having a different nature, configuration and/or dimensions. Another disadvantage of the prior known wrapping machines resides in the fact that they effect the wrapping operation by rotating the items being wrapped about a vertical axis or push them through a web tunnel which results in poor web tension and a single wrap. One of the problems of many present machines arises from the fact that items being wrapped are always maintained in an unchanging fixed vertical orientation, consequently, if the items consist of bags or the like containing powered or similar materials which tend to settle, the bags will bulge outwardly at their bottom portions so as to result in a non-symmetric finished package which is both aesthetically unattractive and functionally deficient in not being capable of being easily stacked or stored. Another shortcoming of many conventional machines is that they present only a wrapping machine and not a complete system.

2. U.S. application Ser. No. 962,610, now U.S. Pat. No. 4,283,903

In copending U.S. patent application Ser. No. 962,610, now U.S. Pat. No. 4,283,903, the bundle, product or packages to be wrapped are moved into the wrapping station with the leading edge of the bundle engaging the film or web. The leading edge carries the web into the wrapping station and between the bundle/product and the reciprocating tine or clamp. Where the clamp is engaged, the end of the web is held tightly against the bundle/product. A third set of tines or a single blade is fixed on the turret plate between the upper and lower tines or clamps and are used to stop the product or packages when they are inserted into the wrapping station. When the bundle is wrapped, all of the clamps and the positioning blade are wrapped. There is also a dancer-idler roller for moving the web to a run position from the clamp load position which is controlled by an air cylinder and piston rod. The air pressure in said cylinder is controlled in order to provide a cushion support for the dancer-idler roller and to prevent excessive shock or jerking of the web during the wrapping operation. A smooth tack down roller and cutting blade are then moved toward the bundle and stretched web at the end of a wrapping cycle for cutting and tacking the end to the bundled product. A push-off means ejects the completed package. Further, by the simple construction and configuration of parts, it is possible to provide for either right or left hand feed of the machine.

SUMMARY OF THE INVENTION

This invention is an improvement of the one disclosed in U.S. patent application Ser. No. 962,610, now U.S. Pat. No. 4,283,903, which eliminates many of the expensive and complex parts associated with the package clamping means, the film feed positioning means, the film bond cut-off means and the required system control interfaces. The turret plate, dancer idler and fluid power passageways in main shaft are eliminated along with their mounting components, complex actuator controls and high cost. This invention provides for receiving package components at an infeed-loader station from a processing line and automatically loading, wrapping and ejecting a wrapped package into/onto a take away apparatus. Further, this invention positively feeds out a predetermined length of a loose portion of film web required for positioning a web between the movable clamp bank and the package components for subsequent clamping. Also this invention provides an improved film bond cut-off means.

A better understanding of the preferred embodiment and alternative embodiments of the invention will be achieved when the following written description is considered in conjunction with the appended drawings.

OBJECTIVES AND ADVANTAGES

It is an object of this invention to provide a simplified means and a completely integrated system for infeed-loading and wrapping of bundles of packaged goods.

A further object is to eliminate costly and complex systems used heretofore in attaching the wrapping material to the packages to be wrapped.

A further object is to provide bonding and severing of the wrapping material in a reliable manner that allows a cutter blade to approach the wrapped bundle but which does not sever or damage the wrapping on the bundle itself.

A further object is to provide a positive bonding of the severed wrapping end to the wrapped package, and, when required, a heated tacking roller can be used.

A further object is to provide an increased production rate due to the reduced number of operations, moving parts, complexity of controls, consumption of pressurized work fluid, and provide a complete integrated infeed-loader means.

It is a further object to provide for optional right and left hand feed configuration by mere assembly procedures.

The main advantage of this invention is the reduced complexity of the bundle wrapping machine system which results in substantial savings in the number of parts required for the machine and its interfacing into a complete system with a consequent reduction of energy, installation, and maintenance costs which is achieved by reduction of a number interfaces and of potential parts to fail.

A further advantage is the increased production rate which is achieved through the simplified operation and system control. High rates of production are required in modern automatic processing line operations.

A further advantage is that the design permits the use of identical parts in right and left handed machines.

BRIEF DESCRIPTION OF THE DRAWINGS

FIGS. 11A–11B are sectional views of the infeed-loader, taken along lines of FIG. 1.

FIG. 12 is an alternative embodiment partial view of the wrapping machine system right hand assembly.

Figure 1:
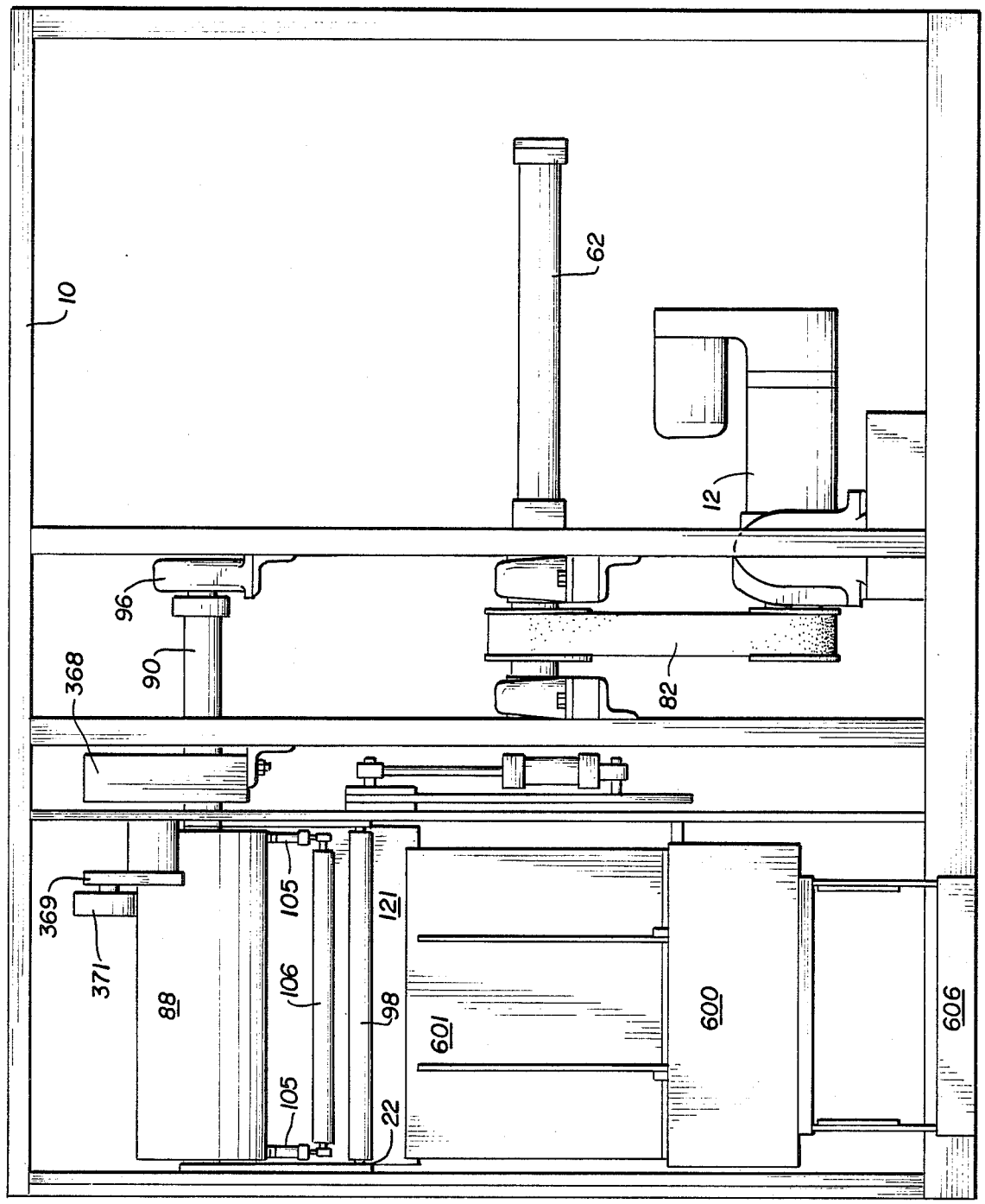
FIG. 1 is a front elevation view of the package wrapping machine system.
Figure 2:
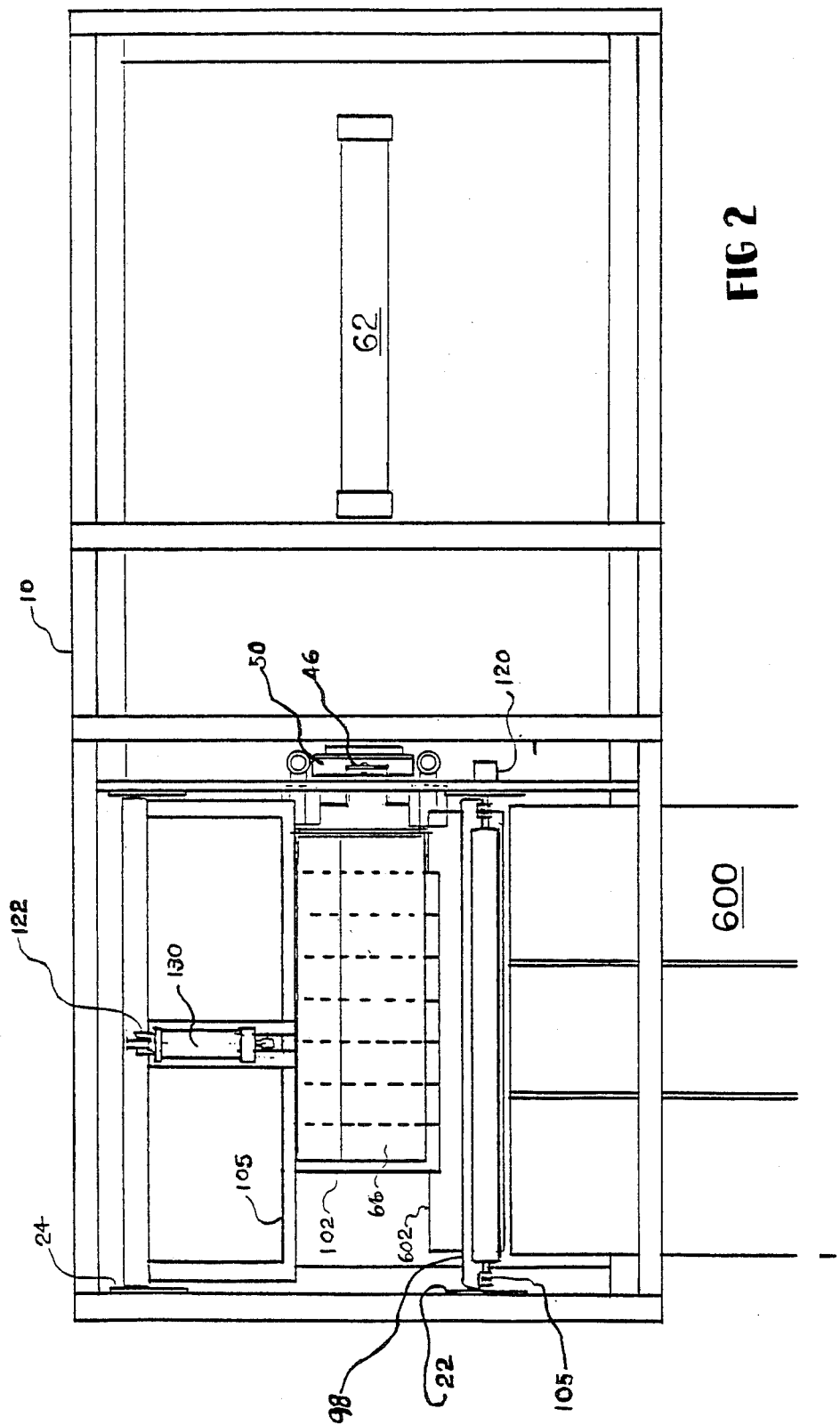
FIG. 2 is a partial plan view of the wrapping machine system, right hand assembly.
Figure 3:
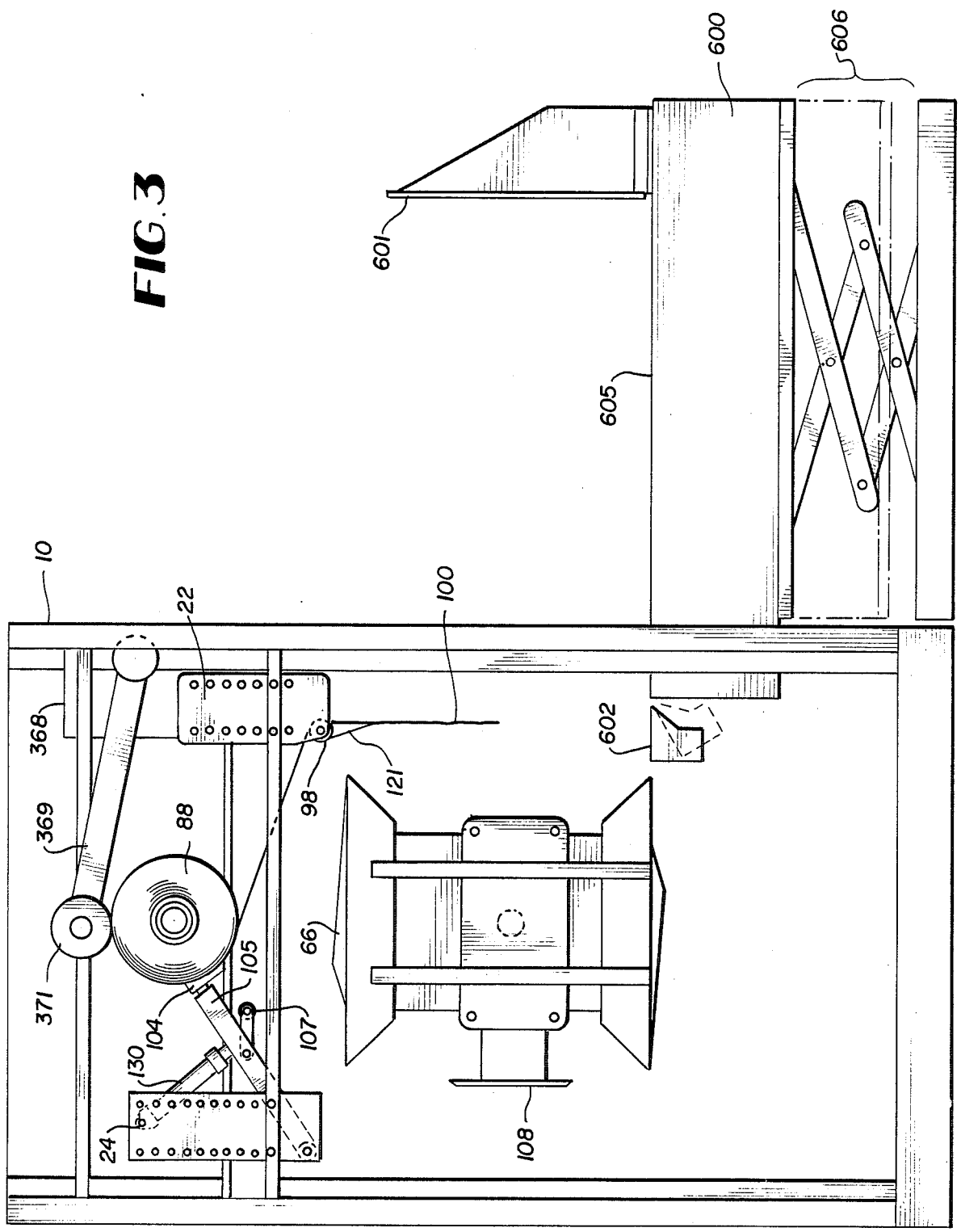
FIG. 3 is a left end view showing the wrapping station, the web positioning-feeding apparatus, film cut-off-bond apparatus, and the infeed-loader apparatus.

Attention is initially invited to FIGS. 1, 2 and 3 which show the frame of the package wrapping machine upon which all other components are mounted. The frame 10 is constructed of welded steel sections which are of various cross sections. The welded steel sections form an outer frame which may also serve as a convenient location for mounting of enclosure plates for the machine. The various components of the wrapping machine are mounted on or attached to the frame such as the drive motor 12 which drives the power driven rotary member about its horizontal axis generally depicted as 14, the rotary member bearings 16 and 18, and the film web and supply means 22. Further, other components such as the film feed-idler means 22 and the web bond-cutting means 24 may also be mounted on suitable extensions of the frame which are merely welded in place to support the said components of the machine. The frame, of course, may be of any other suitable design which will securely hold the various operating components in their relative positions according to the specification hereinbelow.

The main shaft bearings 16 and 18 support the main shaft 26 which is journalled for rotation. A flange plate 30 is mounted on the forward end of the main shaft 26 (FIG. 4) to which the package clamping means is connected by bolt and nut assemblies 32.

Figure 4:
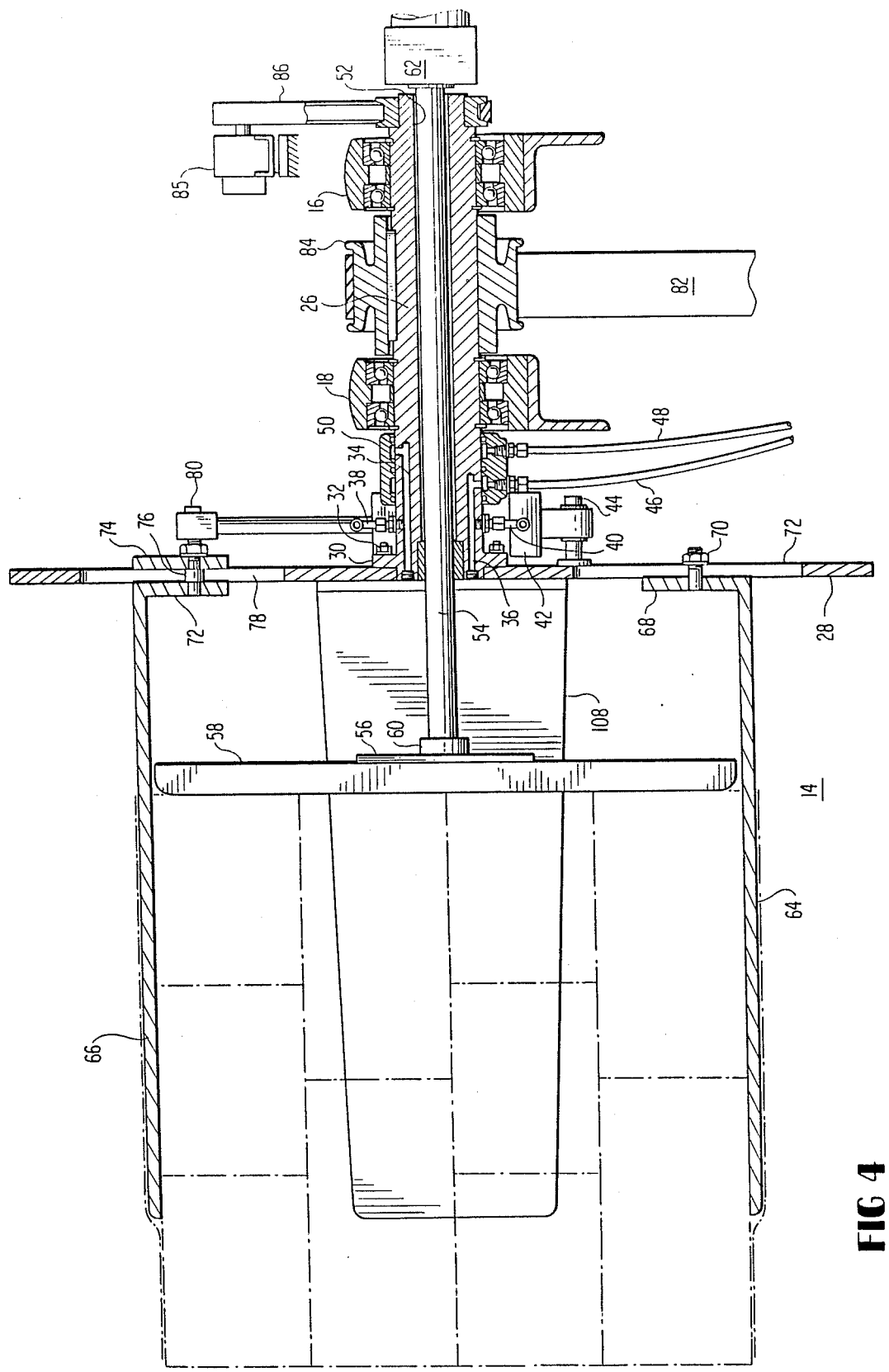
FIG. 4 is a sectional view taken along lines of FIG. 2 showing the mechanism of the rotary member.

The rotary union 50 sits on the front end portion of the main shaft 26. The rotary union 50 includes first and second fluid power passageways 34 and 36 with a fluid power hose 38 being in communication with passageway 34 by means of a fitting as shown in FIG. 4 and a similar hose 40 being in communication with the passageway 36 in like manner. Hose members 38 and 40 are each respectively connected to opposite ends of a pair of product clamping fluid power cylinder 42 which have their cylinder portions mounted on pivot members 44 extending from the rear face of flange plate 28. Passageways 34 and 36 also respectively communicate with hose members 46 and 48 by way of a rotary union 50 as shown in FIG. 4. The hose members 46 and 48 extend from control valve V-3 connected to the output of an air tank or other source of compressed air illustrated in FIG. 9 to permit the supplying of pressurized air to either of hose members 46 and 48 while the other hose member is connected to atmosphere. Consequently, it will be appreciated that air pressure can be applied to either hose member 40 or hose member 38 for effecting simultaneous extension on retraction of the cylinders 42 which operate the package clamping means whether stationary or rotating. It should be understood that, while compressed air is used to operate the clamp cylinders and the like of the preferred embodiment, any other pressurized power fluid such as hydraulic fluid could be used, if desired.

The rotational drive for the main shaft 26 is provided by drive motor 12 which is drivingly connected by a tooth belt drive 82 to a toothed drive cog 84 on said main shaft 26. The motor used for this application is a direct control, two speed gear motor assembly. It should be understood that, while a two speed gear motor assembly is used to operate this embodiment, any other drive power source with or without separate clutch/brake unit such as fluid power motor could be used. A shaft position sensor means 85 is connected to the main drive shaft 26.

A web 100 (FIG. 5) of wrap material is unreeled from the roll 88 for the purpose of being wrapped about a plurality of packaged components which are clamped between clamp members 64, 66.

Figures 5, 6:
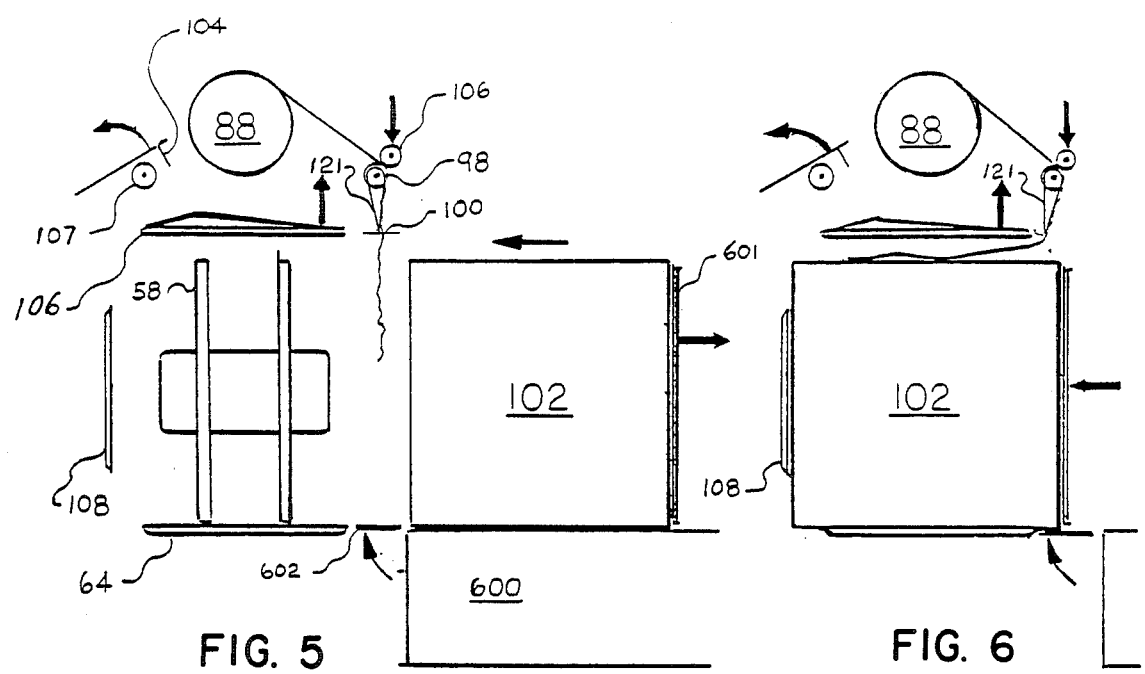
FIG. 5 is a schematic representation showing the left end view with the severed loose end of the package hanging in front of the wrapping station prior to infeed-loading.
FIG. 6 is a schematic representation of the left end view showing the loose film under the clamps, after loading, prior to clamping.

As can best be seen in FIG. 3 and schematic diagrams 5, 6, 7 and 8, feed-idler 98 is used to feed out and position the wrap material 100 in front of the movable upper clamp 66. This is illustrated in FIG. 5. In this condition, the idler-roller 98 and feed roller 106, as positioned with film web 100 clamped between whereupon by selectively rotating feed-roller 106 sufficient web 100 hangs loosely down from the roller 98 in the path of the package components 102 as they are inserted into the wrapping station. Additionally included is the film shoe 121 which is pivotly mounted so as to force the web 100 loose portion downwardly after film web is severed and provide a stripping action during film feed.

FIG. 6 is a similar schematic which shows the package components 102 in place between the clamps with the loose web of material 100 extending between the packages 102 and the upper clamp 66.

Figures 7, 8:
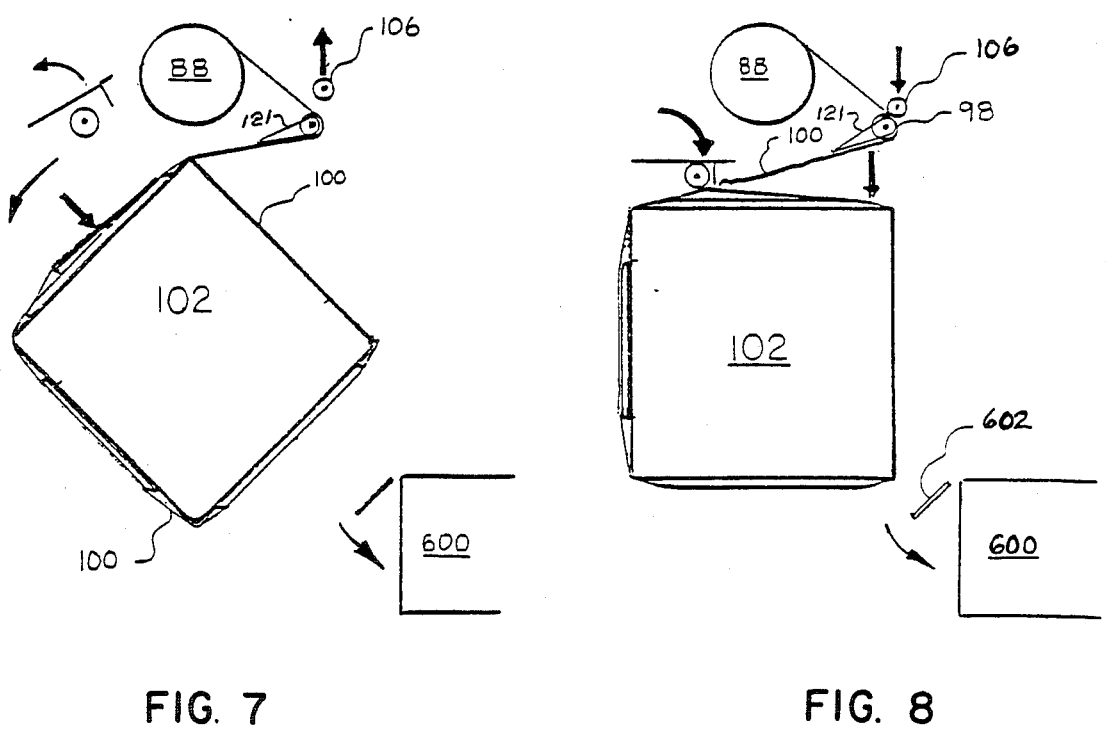
FIG. 7 is a schematic representation of the left end view showing the clamped web during package rotation.
FIG. 8 is a schematic representation of the left end view showing the web bonded to the wrapping as the blade shears the web.

FIG. 7 is a further schematic showing the placement of the feed-idler 98 the feed-roller 106 during the wrapping operation. During the wrapping operation, the article clamping means holds the loose end of the web 100 securely in place. Further, the swing door 602 moves down, along with the return of infeed ram 601 in order to provide clearance away from the spinning package components and clamps.

In FIG. 8 and FIG. 2, there is shown the apparatus as it appears just as the cutting of the web takes place. In this configuration, the feed-roller 106 has moved to the roller 98 to clamp film web 100 to maintain tension. As can be seen from FIG. 5, once the web 100 has been severed, there will be a portion of the web remaining loose from the idler-roller 98. But this portion of the web which serves as the loose portion which will be carried into the wrapping station at the initiation of the next wrapping cycle wherein the package components are inserted into the wrapping station, is not sufficient due to recovery of the stretched film. With the feed-roller 106 clamped with web 100 against idler-roller 98, feed-roller 106 is rotated by a power means a predetermined number of revolutions to provide a sufficient loose portion of web 100 in path of next package to be loaded. Also shown in FIG. 5 is the roller means 107 which moves on the same arm mechanism as the blade 104. The arm and the blade 104 constitute the film cut-off means for severing the web or film. The roller 107 engages the wrapped bundle and presses the loose portion or the severed portion of the web against the bundle in order to assure the adherence of the loose portion to the bundle. The web 100 may be of the type known as a self-adhering film. The film feed-idler combination 22 also includes clamp feed-roller 106, shown in FIGS. 2 and 3, which is moved against the roller 98 during certain portions of the operating cycle. The clamp feed-roller 106 is engaged with the roller 98 at a time just before the cutting of the web as depicted in FIG. 8 and remains engaged until the web 100 is clamped against the packages 102 in the next wrap cycle. Clamp feed-roller 106 is actuated by an air cylinder(s) 105. As the web is severed, in FIG. 8, the loose portion of the web material will be forced by the weight of shoe 121 to hang down from roller 98. While the clamp feed-roller 106 is still in engagement with web 100 and idler-roller 98, the wrapped packages are ejected from the loading station. After ejection of the wrapped packages the feed-roller 106 is rotated to feed out and down a loose portion of web 100. The clamp feed-roller 106 is also maintained in its clamping position after feedout until the packages are inserted into the wrapping station as shown in FIG. 6. The clamp feed-roller 106 is then disengaged to allow wrapping of the material about the clamps and packages as depicted in FIG. 7.

In FIGS. 2 and 3, there is shown a package positioning and support means or elongated blade 108 located at the backside of the loading station, or to the left side of a right handed machine of the flange plate 28 as viewed in FIG. 3. The positioning and support means will be wrapped within the package. In the alternative embodiment show in FIGS. 12, 13, 15, 16, 17 and 18 the package positioning means swings away from rotating package after clamping and is not wrapped with the package.

The cutter bar and bond roller assembly 24, best shown in FIGS. 1 and 3, constitutes a film cut-off means 104 and a means for applying pressure to the loose portion next to the package such as bond roller 107. The blade 104 and the spring pivoted roller 107 are mounted on a common arm which pivots up and down in slight arc vertically. The arm 105 is pivotly supported by shaft 122. The arm 105 supported by shaft 122 carry the film cut-off means 104 and bond roller 107 downward into contact with the web. An air cylinder actuating means 130 is connected to the arm 105 at one end to the cylinder support at point 132. The air cylinder 130 is the means for moving the bond roller 107 and blade 104 toward the web. Point 122 may comprise a bolt or any suitable attachment means.

Figure 9:
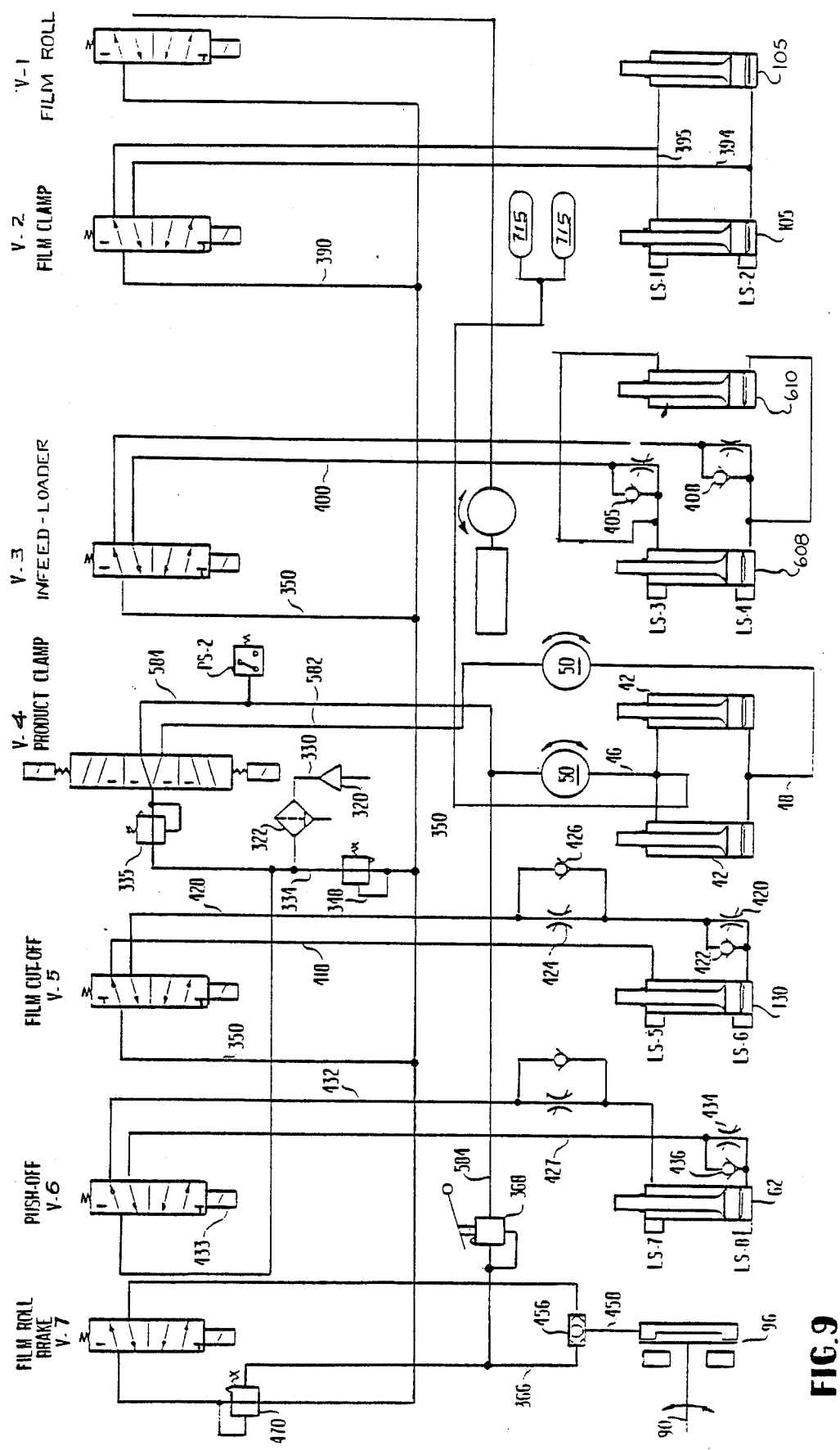
FIG. 9 is a schematic diagram of an electropneumatic control that can be used for sequential control of the system.

FIG. 9 illustrates the electro-pneumatic control and power system for controlling the various pneumatic cylinders. The control may be of other known types. Specifically, a source of compressed work fluid 320 at between 80 and 160 pounds per square inch gauge supplies work fluid to a filter 322 which filters the work fluid then flowing through a line 330 to a distribution line 334 which is connected to a plurality of controlled valve members to be discussed.

The distribution line 334 to a pressure regulator 335 which is in turn connected to a product clamp valve V-4 to which the hose member 582 and 584 are connected. The opposite ends of the hose member 582 and 584 are connected to the rotary coupling 50 to provide communication with the hoses 46 and 48 which are connected to the product clamping cylinders 42. Fluid through hose 46 contracts the cylinders 42 while fluid in hose 48 extends the cylinders to an unclamping position in which the upper clamp member 66 is in the position at the greatest possible distance from the lower clamp for permitting the loading of the packages 102 on the lower clamp. A pressure sensitive switch PS2 is connected to hose 584 and has contacts closed when pressure in the hose equals or exceeds a desired value necessary for clamping and safely holding packages 102 during a wrapping operation. The hose 584 extends from the product clamp valve V3 to the rotary coupling 50 to provide communication with the hose 48 which is connected to the rod end of cylinder 42 so that the supply of compressed fluid through hose 584 effects a clamping of the package components supported on the lower clamp 64. It should be observed that a pressure sensitive switch PS-2 is connected to the hose 584 for ensuring that adequate clamping pressure is always present in the hose. PS-2 prevents operation of the machine by precluding operation of a cycle initiating relay CR(FIG. 10) in the event of the pressure in hose 584 falling below the predetermined number of pounds per square inch gage required for maintaining adequate clamping force on the packages 102.

The high pressure line 334 is connected to a pressure regulator 348. The pressure regulator 348 reduces the pressure to a predetermined pressure. Connected to the low pressure line 350 are the film roll valve V-1, the film clamp valve V-2, the infeed-loader valve V-3, the film cut-off valve V-5, and film roll brake valve V-6.

The high pressure line 334, in addition to feeding the pressure reducing valve 348 also feeds high pressure directly to the push-off valve V-6.

The brake valve V-7 is a single output line 454 which is connected to a shuttle valve 456. The shuttle valve has an output line 458 which feeds the pneumatic pressure to the brake mechanism 96 which in turn controls the braking force applied to the film roll shaft 90. The high pressure is required at the portion of the cycle wherein the film roll must be brought to rest rapidly as the main shaft 26 is brought to rest. Without the additional braking applied by the high pressure supplied by lines 454 and 458 under control of brake valve V-7, there would be a tendency for the film roll to overrun its stopped position. The film roll may move at a speed of approximately 1,000 rpm, and may weigh in excess of 60 pounds, and, for this reason, the high pressure brake is essential.

Also applied to the shuttle valve 456 is a second source of air from line 584 which is in the line which feeds the product clamp cylinders 42. When the product clamp is engaged, line 584 is under regulated high pressure. A pressure control regulator 368 is connected to line 584 to provide a lower controlled pressure to the brake 90 during the time that the package clamp is actuated and during the time that the brake valve V-7 is off.

This control regulator 368 is operated by an arm 369 and a roller 371 which rides on the film roll 88. The pressure control regulator 368 is therefore regulated as a function of the diameter of the roll. This adjusts the pressure and to maintain correct tension and compensate for the change in diameter of the roll as the web is consumed during operation.

When the film roll brake valve V-7 is turned on, high pressure feeds down line 454 and the shuttle valve 456 permits the high pressure to flow to brake 96 by way of line 458 and cuts off the flow of air to line 366 and the pressure reducing valve 368.

Also connected to line 366 is a pressure differential regulator 470. Differential regulator 470 also adjusts the high pressure from line 350 to compensate for changes in the diameter of the roll 88 as web 100 is consumed. When the roll diameter decreases, the brake pressure must be reduced in order to prevent snapping of the web.

In operation, the brake provides for high pressure braking which stops the roll, and for low pressure braking which maintains tension on the web during wrapping operations.

The film clamp solenoid control valve V-2 is connected by a conduit 390 to the distribution conduit 350 and the valve is normally maintained in the closed position illustrated in FIG. 9 by a positioning spring 392. Conduits 394 and 395 extend from valve V-2 and are connected to the air clamp cylinders 105. Actuation of the solenoid film clamp valve V-2 positions the valve to provide pressurized air to conduit 394 to cause the air clamp cylinders to be extended to effect a clamping of the web 100.

The push-off solenoid control valve V-6 receives air from the conduit 334 at supply pressure and when positioned by solenoid 433 directs the pressurized air to a conduit 427 having a manually adjustable flow control valve 434 and a parallel bypass check valve 436 with the end of the conduit being connected to the extend inlet port of the cylinder 62 FIG. 1. Similarly, the rod end of the cylinder 62 is connected to conduit 432 for the return stroke.

The push-off solenoid control valve V-6 includes a spring normally maintaining the valve in the position illustrated in FIG. 9 in which the push-off plate is retracted since cylinder 102 is retracted.

Figure 10:
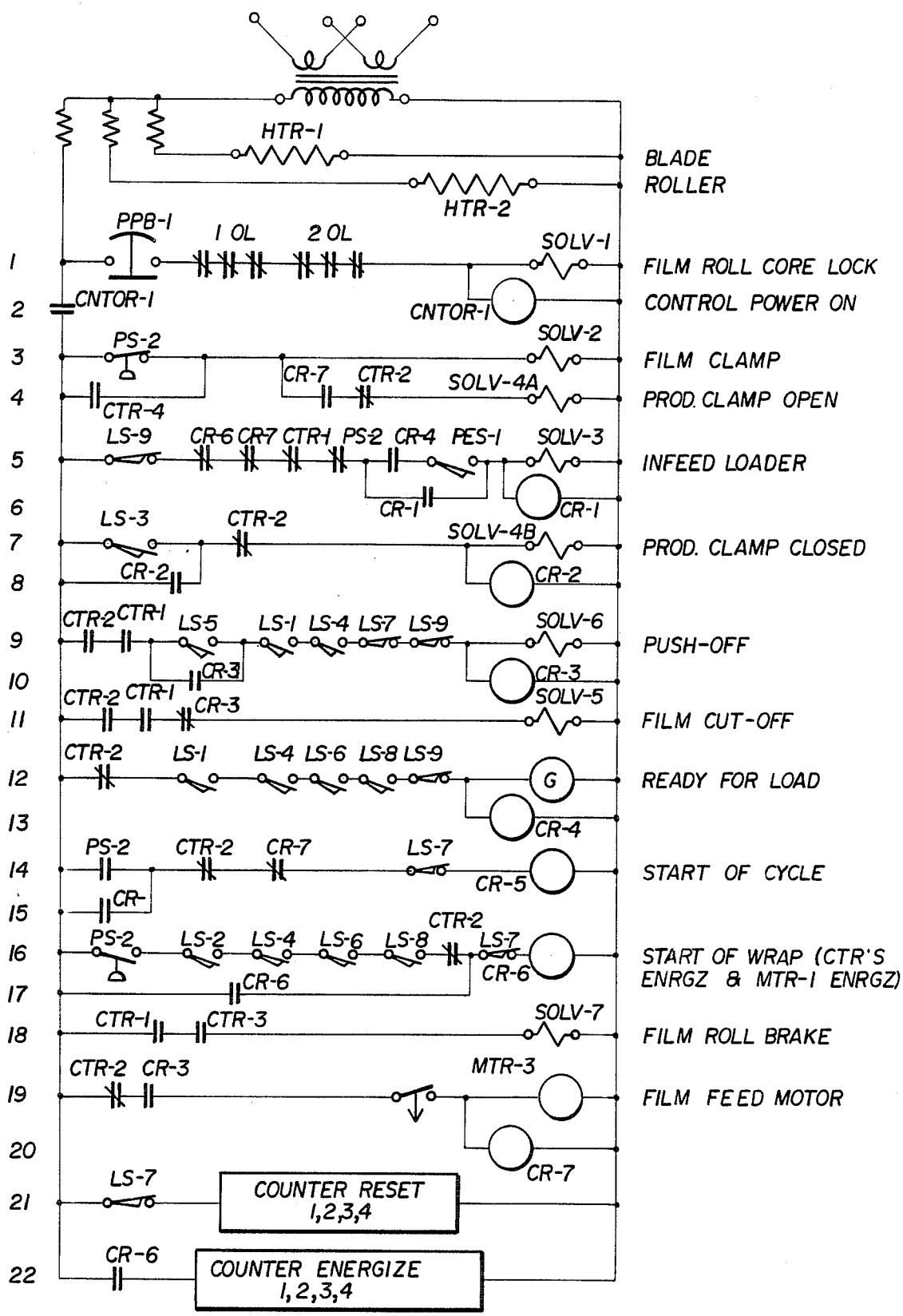
FIG. 10 is a diagram of the electrical control of the system.

In FIG. 10, there is shown the ladder diagram which is used for control of the wrapping machine described herein. Before discussing in detail the ladder diagram, it should be noted that this machine can utilize a central control unit similar to the type known as Line-O-Logic Controller manufactured by Automatic Timing and Controls Company of King of Prussia, Pennsylvania. The specific model utilized in this device is known as the LDC-40. In this type of controller, there are numerous counters and controls, all of which respond to a shaft position sensor which measures the position of a basic machine rotating element. In this particular machine, shaft position sensor 85 with means of serrated disk 86 to measure the position of the shaft 26 during wrapping operations. Various counters count the pulses from shaft position sensor (hereinafter "SPS") 85, and when certain predetermined counts are reached, certain machine functions are initiated or terminated.

Now, with specific reference to FIG. 10, it should be first noted that the symbol CTR refers to the digital counter. There are four counters used in this embodiment of the invention. The first counter CTR-1 responds to SPS 85 and counts the revolutions of the shaft 90. This is the counter for determining that film was wrapped or used. Counter 2 counts a preset number of pulses from SPS 85 for controlling the number of wraps and low speed motor. Counter 3 counts a predetermined number of pulses from SPS 85 and is used to energize the high speed motor. Counter 4 counts pulses from SPS 85 and is used to de-energize the large motor and energize the film roll brake. Referring now specifically to FIG. 10, in line 1, there is shown as element PPB-1, the power-on control for all controls. PPB-1 is the main control power switch for the system. In series with contractor CNTOR-1 are a number of motor overload relays generally depicted as 1-OL, and 2-OL. These overload sensors will open the circuit and prevent energy from reaching the coil of contractor 1 and will stop all operations if motors are overloaded. Also SOLV-1 is energized on line 1 expanding film roll core lock.

At line 2, CNTOR-1 applies power to the main machine control ladder.

In line 3, there is shown pressure switch PS-2, which senses the produce clamp pressure and which is closed when there is no pressure at the product clamp cylinders 42. When switch PS-2 is closed, the solenoid valve V-2 is energized and the film clamp will be applied. At line 4, connected in series with PS-2 is CTR-4 (counter 4) which will also energize the film clamp solenoid valve when the high speed motor shuts down. Again, on line 4, there is shown a control contact CR-7, and another contact of CTR-2 which are used to control the product clamp open solenoid valve.

In line 5, there is shown limit switch LS-9 which is the zero shaft position sensor directly detecting a lug on shaft 26. CR-4 of line 5 is controlled by the coil CR-4 which is directly connected to the coil CR-4, and at line 13 of FIG. 10. Thus, LS-1, LS-4, LS-6, LS-8, CTR-2, PES-1, CR-7 and PS-2 combine to control solenoid valve SOLV-3 of the infeed-loader valve V3, which is depicted in FIG. 9. When the infeed-loader ram is actuated PES-1 will also open and also IS-8, so across PES-1 and CR-4 is placed a relay contact CR-1 which is controlled by CR-1 coil. This produces a latching arrangement allowing full extention of the infeed-loader ram until package is clamped and PS-2 opens.

At line 7 of FIG. 10, there is first shown LS-3 which, when closed, energizes a product clamp solenoid SOLV-4B. Associated with this limit switch LS-3 are on line 8 control relay 2 with its control coil CR-2 contacts CR-2. The CR-2 arrangement is merely a latch arrangement which permits starting of the clamping cycle by a momentary closing of LS-3.

In line 9, there are shown the various conditions necessary for actuation of the push-off by way of valve V6. The first condition is that CTR-1 (counter 1) must indicate that there has been film applied to the wrapping. Second, counter 2 (CTR-2) must indicate that the wrapping cycle is complete. Next, limit switch LS-5 must indicate that the film cut-off has been actuated and then LS-1 must indicate that the film clamp has been closed. LS-4 must indicate that the infeed-loader ram is not in its extended position toward the wrapping, and, finally, LS-7 is shown in its closed position and will only open when the push-off arm has extended. When the push-off ram is actuated, LS-5 will also begin to retract, and across LS-5 on line 10 is placed a relay contact CR-3 which is controlled by the CR-3 coil. This produces a latching arrangement and allows retraction of the film cut-off during push-off. When the push-off rod 54 is fully extended, LS-7 will open, and the power to solenoid 6 will be cut off.

In line 11, there is shown the control for the film cut-off. The film cut-off is responsive to counter 2, counter 1 and control relay 3. Control relay 3 is the relay which is controlled by the push-off. When control relay coil CR-3 (line 10) is not energized, CR-3 of line 10 will be closed. By this technique, energization of the film cut-off cylinder 130 is prevented during push-off operations.

In line 12, there is shown the conditions required for loading. Shown first is CTR-2 which is normally closed but which will open when the counter 2 counts out. The ready-for-loading green light will immediately go out upon energization of SOLV-3 and opening of LS-4. Also, in line 12 for the ready-to-load condition, are limit switch LS-1 associated with the film clamp, limit switch LS-4 connected to the infeed-loader, limit switch LS-6 connected to the film cut-off and limit switch LS-8 connected to the film push-off. In essence, each of these limit switches senses the correct position of each machine element. At line 13, there is shown the coil for control relay 4.

At line 14, there is shown the start of cycle contact which is a clamp pressure sensor PS-2. A coil CR-5 and contracts CR-5 are used to latch the start cycle. Also shown here are contacts of counter 2, and these contacts remain closed until counter 2 completes its count which prevents a false start. Also shown are CR-7 film feed motor deenergized, and LS-7 normally closed either of which can deenergize CR-5 contacts after PS-2 opens.

Line 16 shows the conditions necessary for the initiation of the wrapping operation. These conditions are that the pressure switch PS-2 indicate that there is pressure in the product clamps, that the film clamps be open (LS-2), that the infeed-loader ram be away from the wrapping area (LS-4), that the film cut-off be retracted (LS-6), that the push-off be retracted (LS-8), and that the counter 2 has not counted out. When these conditions exist, the coil of control relay 6 will be energized and power will be applied to the motors and that all CTR's are actuated.

Line 18 shows the film roll brake control, which is applied to solenoid valve 7. In essence, it requires that the two counters (CTR-1, and -3) have completed their cycles, in order that the film roll brake be applied for a predetermined length of time.

Line 19 shows the film-feed motor control whose run time is controlled by an off delay-time delay relay TDR-1 to a predetermined set time interval. The conditions shown for energizing the film feed motor are that CTR-2 has counted out and that the push-off SOLV-6 (CR-3 coil) has been energized.

In line 21, there is shown the counter reset which is responsive to limit switch LS-7 of the push-off rod cylinder.

In line 22, there is shown the counter energization. To energize the counters, the coil control relay 6 must be turned on, and this is accomplished at the beginning of the wrapping cycle in accordance with line 16.

From the above description, it can be seen that this invention provides a completely automatic film wrapping technique of a simplified form which may be used to wrap products in plastic films or other materials which may be of the self-adhesive type.

Described above in FIGS. 9 and 10 is an electropneumatic actuator control system, it should be understood other systems of actuators and controls could be used to perform the identical functions.

Figure 11B:
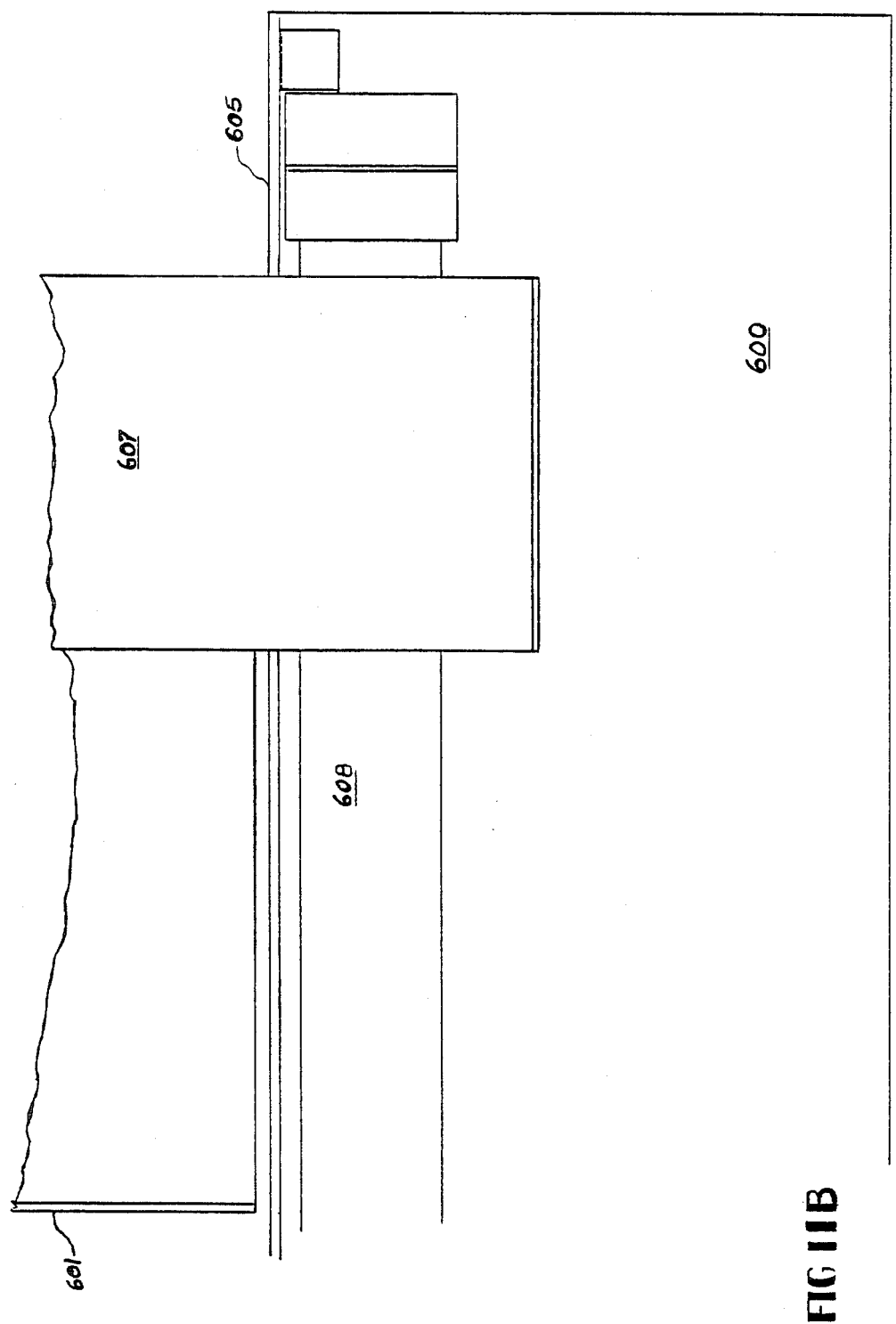

In FIG. 11 there is shown a sectional view of the infeed-loader 600. The infeed-loader means is comprised of an infeed ram plate 601, swing door 602, positioning arm 603, positioning plate 604, slider-deck 605, base support 606, pusher-slider 607, infeed ram actuator 608, toggle linkage 609, and swing arm actuator 610. When package components are placed in position for loading on the slider-deck 605, determined by PES-1 sensor, the infeed ram actuator 608 is powered toward the wrapping station and at the same time the swing arm actuator 610 is powered actuating toggle linkage which moves positioning arm 603 in an upward arc to a locked position placing swing door 602 in same plane as slider deck 605 providing a slider path for infeeding package components as infeed ram plate 601 pushed by infeed ram actuator 608 advances toward wrapping station. After infeed ram 608 has fully extended LS-3 actuates product clamp 66 work fluid pressure in clamp cylinders 42 increases to a preset level sensed by PS-2 which de-energizes SOLV-3 retracting infeed ram 608 and swing arm actuator 610. When infeed ram 608 is fully retracted LS-8 actuates wrap cycle and infeed-loader is ready for new load.

Figure 13:
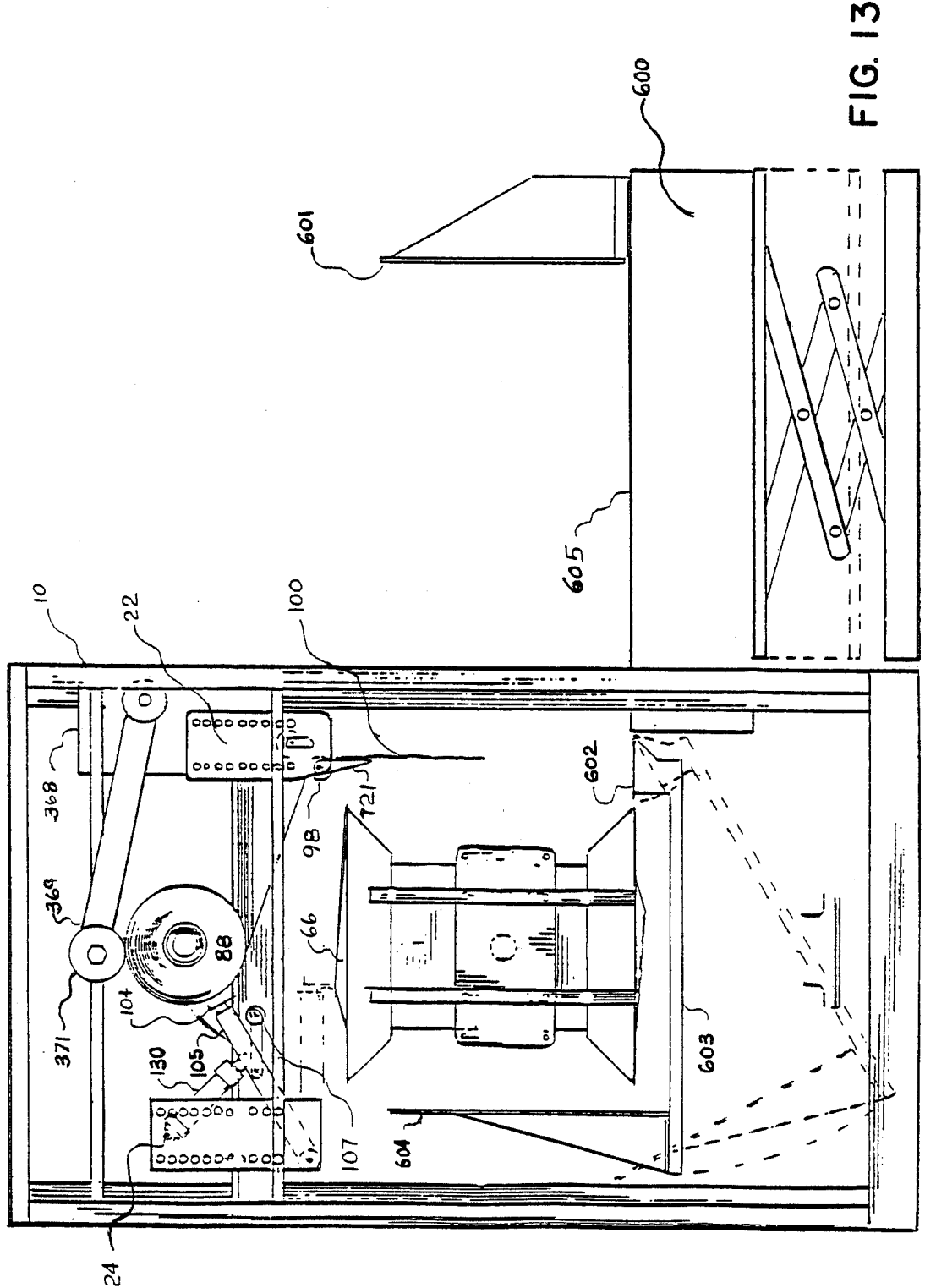
FIG. 13 is an alternative embodiment left end view showing the wrapping station, the web positioning, apparatus, film bond-cut-off apparatus, the package affixed infeed stop, and the infeed-loader apparatus.

In FIG. 12 is shown an alternative embodiment employing the use of positioning plate 604 as shown in FIG. 13, 15, 16, 17, 18 and deleting the use of positioning-support plate 108 shown in FIGS. 3, 5, 6, 7 and 8. The use of either positioning-support plate 108 or positioning plate 604 is optional and dependent on type of package components that are to be wrapped. Either of said options used is a simple removal and installation by bolt-nut assemblies.

In FIG. 13 the reader is referred to the above paragraph. FIG. 13 illustrates the system using the positioning plate 604 in place of the positioning-support plate 108 which is the only difference between FIG. 3 and FIG. 13.

Figure 14:
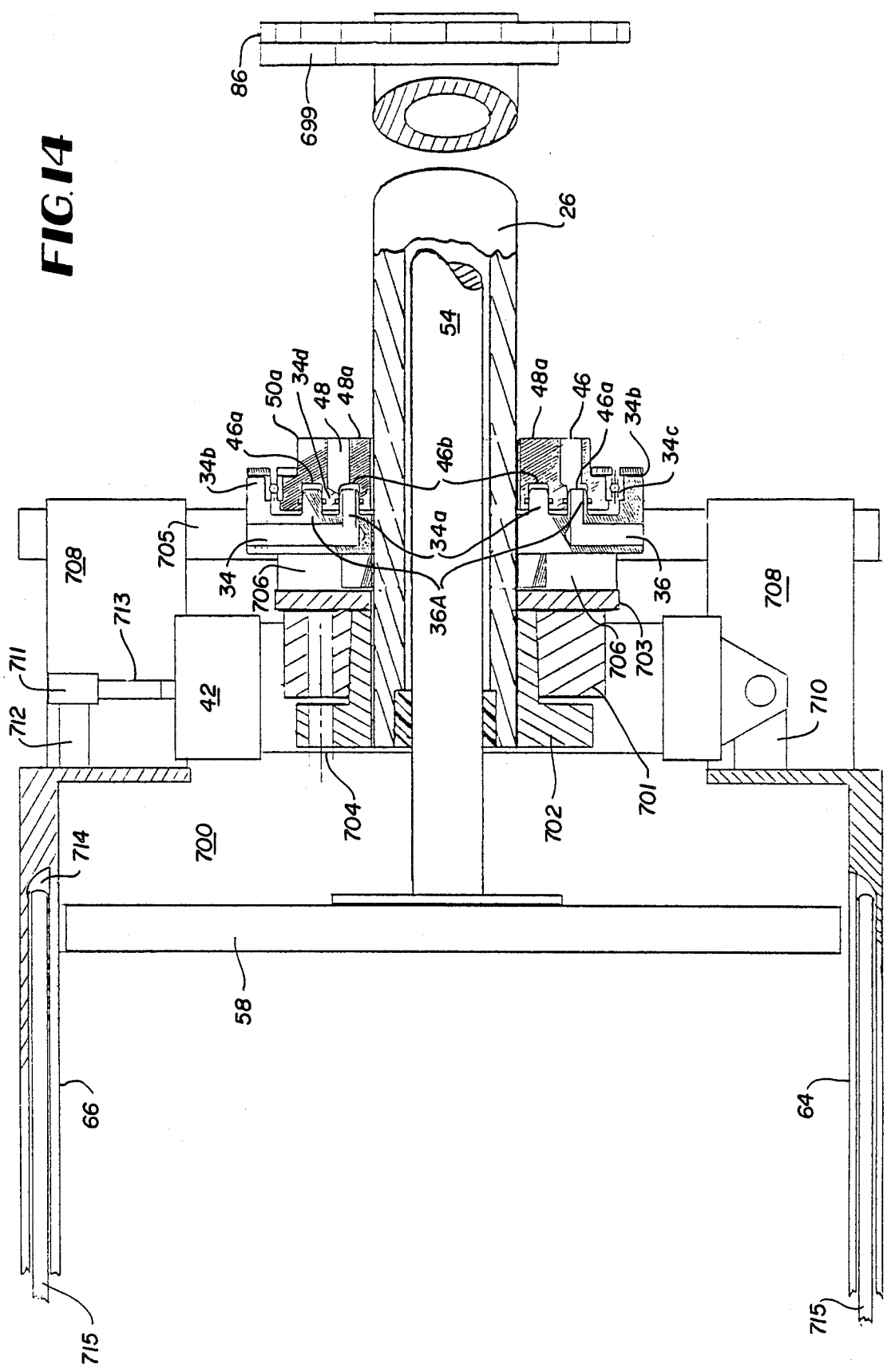
FIG. 14 is a sectional view taken along lines of FIG. 1 showing the mechanism of the clamp banks.
Figures 15, 16:
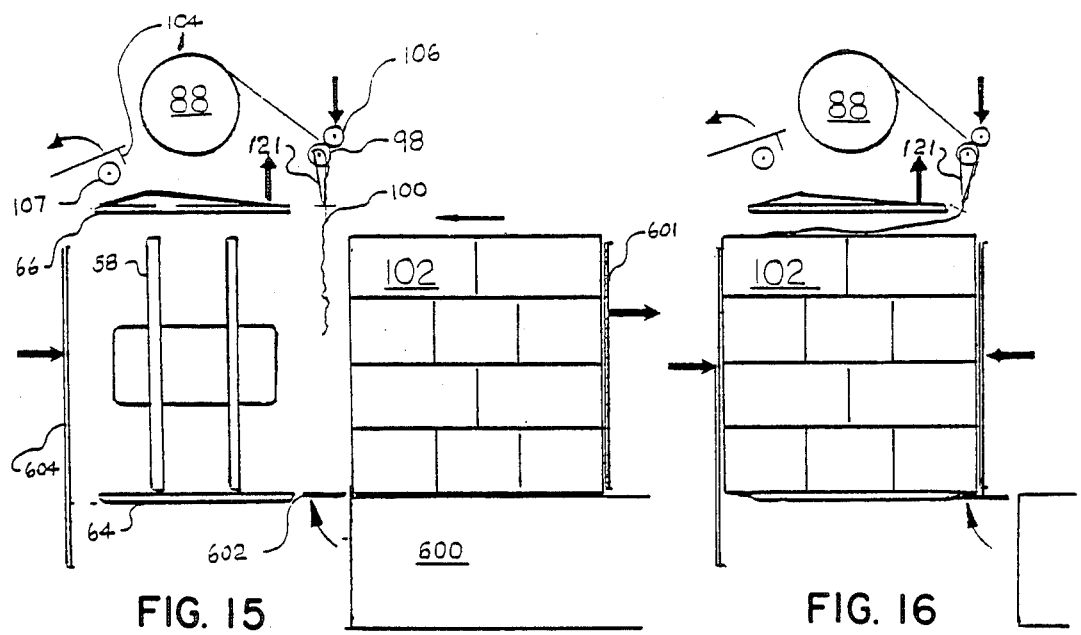
FIG. 15 is an alternative schematic representation of the left end view showing the loose film under the clamps, after loading, prior to clamping.
FIG. 16 is an alternative schematic representation of the left end view showing the loose film under the clamps after loading, prior to clamping.
Figures 17, 18:
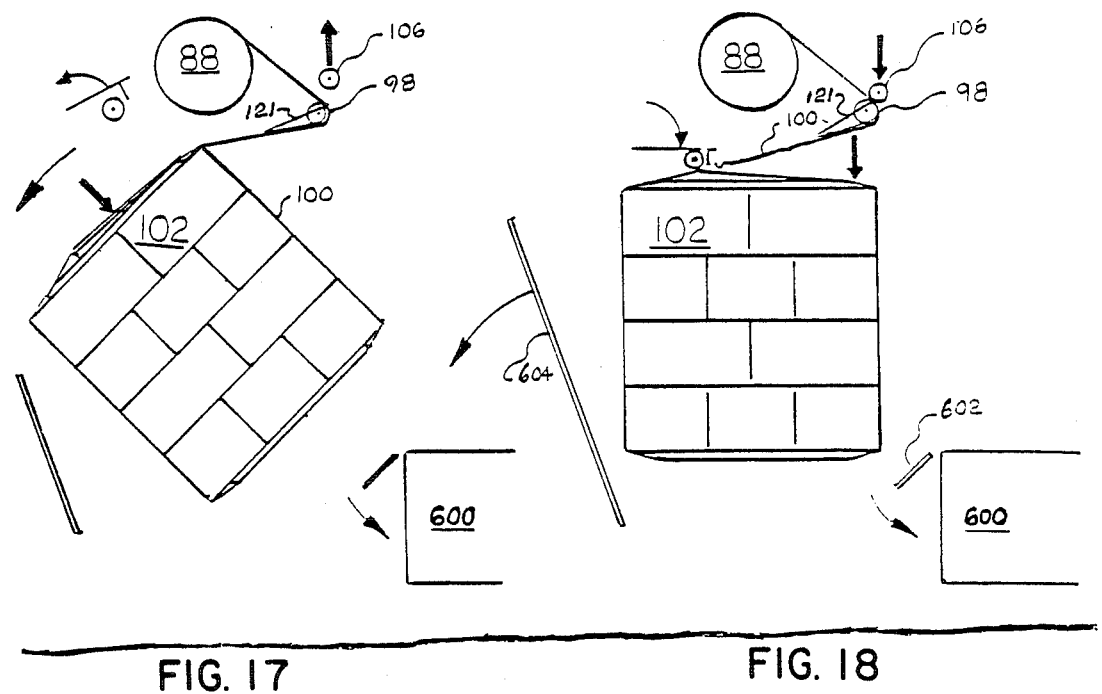
FIG. 17 is an alternative schematic representation of the left end view showing the clamped web during package rotation.
FIG. 18 is an alternative schematic representation of the left end view showing the web bonded to the wrapping as the blade severs the web.

FIG. 14 is a cross sectional view of an alternative fluid power coupling means which has the same functions as the rotary coupling element of FIG. 4. The reference numerals shown in FIG. 14 are the same used on FIG. 4 because the parts perform identical functions, but in a different way. The alternate rotary set on a shaft fluid power coupling device 50A provides coupling of fluids from fluid power passage ways 34 and 36 to hose couplings 46 and 48. The coupling device 50A provides a means for transmitting fluid from a stationary supply (hoses 46, 48) to a rotary user (fluid passage ways 34, 36) when in any location on the shaft 26. In order to provide for rotary fluid coupling in any position, grooves 46A and 48A as well as extensions 36A and 34A must be annular and extend completely around said coupling faces. The faces in which the grooves and extensions are mounted must be perpendicular to the axis of a rotation to allow for rotation. Single drill holes are provided through the extensions 34A and 36A to provide for fluid passage to fluid passage ways 34 and 36 respectively. Bearings 34C are shown in the periphery the rotary union and seals 34D are shown between the annular extensions 34A and 36A and the grooves (46A and 48A).

In FIG. 14 there is shown a partial sectional view of the rotating mechanism including the clamp banks, rotary set-on-a-shaft fluid power union, flange plate mounting assembly, package holder, serrated disk, and zero position lug. The flange plate assembly 700 is mounted using a Q.D. hub 701, a Q.D. bushing 702, a threaded hole flange plate 703, and connecting bolts 704. The guide rods 705 are affixed to flange plate 703 by mounting blocks 706 and connecting bolts 707. The clamp banks 66 and 64 are movably mounted to guide rods 705 by slider bearings 708. The positioning screws 709 locate the lower clamp bank 64 (see FIG. 2). The fluid power actuators 42 are pivotly affixed to clamp bank 64 by support 710. The movable clamp bank 66 is connected to rod end 711 by support 612. The spacer rod 713 locates the movable clamp bank 66 with respect to clamp bank 64. The fluid power actuated package holding means includes the slotted cavities 614 in clamp banks 66 and 64 wherein is installed bladders 615 are connected to passageway 34 so that when pressurized work fluid is supplied to effect package clamping by moving clamp bank 66 against package components 102 bladders 715 are extended through slotted cavities 714.

In FIGS. 15, 16, 17, and 18 is shown an alternative embodiment schematic representation that differs from FIGS. 5, 6, 7, and 8 only in that positioning and support blade 108 is deleted and the positioning plate 604 connected to the positioning arm 603 is shown.

Figure 19:
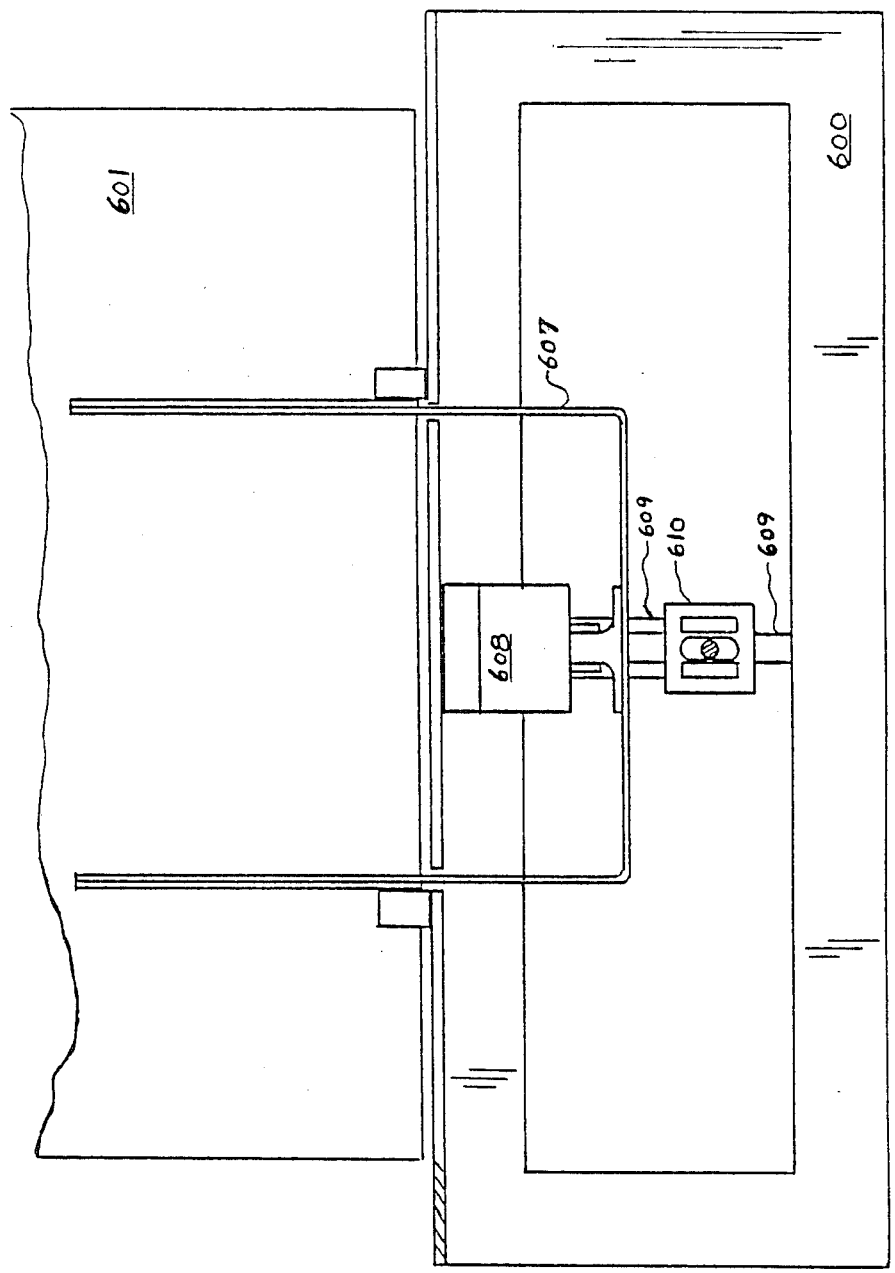
In FIG. 19 is shown a partial sectional view of the infeed-loader 600.

In FIG. 19 is shown a partial sectional view of the infeed-loader 600.

What is claimed is:

1. A rotary set on a shaft fluid power coupling comprising in combination:

a first member having central bore through which a rotary main shaft passes, a first member first face through which a fluid power connection is made, a first member second face which lies in a plane perpendicular to said main shaft having a cylindrical annular groove therein, and a passage within said first member which will permit fluid to flow from said fluid power connection to said annular groove;

a second member which rotates with respect to said first member having a second member first face which lies in a plane perpendicular to said main shaft axis of rotation, said second member first face having a cylindrical annular extension which extends into said first member cylindrical annular groove a distance less than the depth of said cylindrical annular groove thereby forming an annular space, and means for passing a fluid from the said annular space formed between said annular groove and said annular extension to a second member second face having a fluid passage way connecting means; and wherein said second member cylindrical annular extension is engaged with said first member cylindrical annular groove by axially sliding said cylindrical extension into said cylindrical groove.

2. The apparatus of claim 1 further including an annular seal means placed between said first member cylindrical groove and said second member cylindrical annular extension for preventing leakage.

3. The apparatus of claim 2, wherein an annular seal means is placed between said second member cylindrical extension side wall and said first member annular groove.

4. The apparatus of claim 1 further including a plurality of annular grooves in said first member, annular extensions in said second member for each of said plurality of grooves, second fluid passages for said annular grooves in said first member and second fluid passage ways for each of said annular extensions in said second member.

5. The apparatus of claim 2 further including bearing means between said first member and said second member.

6. The apparatus of claim 1 wherein said shaft and second member are connected together and rotate together.

7. The apparatus of claim 2 wherein said annular groove has an interior end wall which is perpendicular to said shaft axis.

8. The apparatus of claim 7 wherein said annular extension has a face which is parallel to said first member first face.

9. The apparatus of claim 8 wherein a seal means is placed between said annular groove walls and said annular extension walls.

10. The apparatus of claim 8 wherein said means for passing a fluid from said annular extension in said second member is a drill hole through said annular extension into the body of said second member.

* * * * *